US005890690A

United States Patent [19]

Klintberg

[11] Patent Number: 5,890,690

[45] Date of Patent: Apr. 6, 1999

[54] SWIVEL ARRANGEMENT

[76] Inventor: Niclas Klintberg, Klotvågen 14, 151 59 Södertälje, Sweden

[21] Appl. No.: 805,340

[22] Filed: Feb. 24, 1997

[30] Foreign Application Priority Data

Feb. 26, 1996 [SE] Sweden .................................. 9600742

[51] Int. Cl.[6] ........................................ E04G 3/00

[52] U.S. Cl. .................................. 248/276.1; 248/281.11

[58] Field of Search ............................ 248/276.1, 281.11, 248/282.1, 284.1, 288.31, 288.51, 278.1

[56] References Cited

U.S. PATENT DOCUMENTS 5,156,062 10/1992 Appleberry ............................... 74/479

FOREIGN PATENT DOCUMENTS 36 43796 7/1997 Germany .
WO 90/11165 10/1990 WIPO .

*Primary Examiner*—Leslie A. Braun
*Assistant Examiner*—Anita M. King
*Attorney, Agent, or Firm*—Burns, Doane, Swecker & Mathis, L.L.P.

[57] ABSTRACT

The present invention relates to a swivel arrangement comprising a first holder unit and a second holder unit, where the first holder unit (1) is assigned a first plane (11) and the second holder unit (2) is assigned a second plane (21). The first plane (11) is parallel to the second plane (21) upon a relative movement between the holder units (1, 2). The invention also concerns an arm structure (3) joining the first holder unit (1) to the second holder unit (2). The second holder unit (2) can be controlled, via the arm structure (3), in a complete or partial circular plane-parallel movement in relation to the first holder unit (1). A first reference direction, which is fixed in relation to, and coincides with, the first plane (11) is parallel to, or in each case essentially parallel to, a second reference direction, which is fixed in relation to, and coincides with, the second plane (21) during the whole of the plane-parallel circular movement.

29 Claims, 2 Drawing Sheets

SWIVEL ARRANGEMENT

TECHNICAL FIELD

The present invention relates to a swivel arrangement comprising a first holder unit and a second holder unit, where the first holder unit is assigned a first plane and the second holder unit is assigned a second plane.

The first plane is parallel to the second plane even upon a relative movement between the two holder units.

The supporting unit also comprises an arm structure intended to join the first holder unit to the second holder unit.

Holder units of this type are commonly used for supporting objects which a user wants to be able to displace relative to a base, for example, where the first holder unit is secured to the base and the second holder unit holds the object.

Possible examples of such objects are tools of various types, computer terminals or lighting fixtures.

PRIOR ART

It has long been known, in the case of a swivel arrangement, to use an arm structure which is intended to give a first holder unit and a second holder unit a mutually parallel relationship in the event of a displacement of the distance between the two holder units.

It is also known to have one of the holder units cooperate with a hinge, which means that the whole arrangement can be swivelled about an axis of rotation which is perpendicular with respect to the parallel planes of the two holder units.

It is also already known to have one of the holder units support a tool or instrument in order to make it easier for an operator to control or use the tool or instrument.

It is also known to have two or more swivel arrangements cooperate so as to create a combination which permits several possible degrees of freedom in the movement between the first holder unit included in the combination and the last holder unit included in the combination.

It is also known that an arm structure which comprises two parallel arms affords a relative movement between two planes in which the parallelism between the planes is maintained during the movement.

The publication U.S. Pat. No. 5,156,062 further discloses an arm arrangement in which a unit can be displaced within a volume without the angle of the unit relative to a reference plane, or its direction relative to a reference direction, being changed.

Publication WO-A1-90/11165 shows a known arrangement which affords a plane-parallel movement between two holder units, and with the relationship between a reference direction in the two holder units being maintained during this movement. The control of the arm structure and the relative movements of the two holder units are based on the cooperation between various belt and gear structures.

Publication DE-A1-3 643 796 shows an arm structure intended to control a machine tool, which arm structure is based on three parallel arms.

For the sake of clarity, the expression perpendicular distance will also be explained.

Perpendicular distance between two holder units is to be understood as the distance between two parallel planes which have been assigned to the two holder units, and not the geometric distance between the two holder units.

These two distances coincide if the arrangement can be and is in a position where the arm structure adopts a perpendicular position relative to the two planes. However, the most common scenario is for the arm structure to be assigned a position where there is an angle of between 0° and 90° between the arm structure and the planes. In this case, the perpendicular distance between the two planes is shorter than the geometric distance between the two holder units.

DISCLOSURE OF THE PRESENT INVENTION

Technical Problem

Taking into consideration the prior art, as it has been described above, and taking as a starting point a known swivel arrangement with an arm structure which operates between a first holder unit and a second holder unit in such a way that a first plane, belonging to the first holder unit, and a second plane, belonging to the second holder unit, maintain a parallel relationship to each other upon a relative distance movement between the first holder unit and the second holder unit, a technical problem may well be seen to lie in establishing how a swivel arrangement will be able to afford a possibility of being able to control the relationship between the first holder unit and the second holder unit in a complete or partial circular plane-parallel movement in relation to each other so that a first reference direction, which is fixed in relation to, and coincides with, the first plane, is parallel to, or in each case essentially parallel to, a second reference direction, which is fixed in relation to, and coincides with, the second plane during the whole of the plane-parallel circular movement, even while forces are acting to change this relationship, despite the fact that the arm structure consists of a simple arm structure which comprises at least three parallel arms having the same length or essentially the same length.

A technical problem must be seen to be that of establishing how an arm structure, with associated attachment hinges between arms and holder units, should be designed so as to be able to give the two holder units a constant perpendicular distance from each other during the plane-parallel circular movement.

Another technical problem is that of establishing how an arm structure, with associated attachment hinges between arms and holder units, should be designed so that it will be possible to give the two holder units a defined constant perpendicular distance from each other during the plane-parallel movement, but where the distance can be altered in the event of a non plane-parallel circular movement.

A further technical problem must therefore be seen to be that of establishing how an arm structure, with associated attachment hinges between arms and holder units, should be designed so that the distance between two holder units will be able to be varied during the plane-parallel circular movement.

A technical problem is additionally to be seen in establishing what measures need to be taken to be able to afford the possibility of allowing a swivel arrangement, upon suitable loading of the arrangement, to be in a balanced state in respect of the variable distance between the two holder units.

An additional technical problem is that of establishing what limitations there are in the distance movement between the two holder units and how an arm structure should be designed to take account of these limitations.

Another technical problem is that of establishing what possibilities are afforded by combining swivel arrangements with other swivel arrangements according to the present invention or in accordance with the prior art.

ADVANTAGES

The advantages which can principally be regarded as characterizing a swivel arrangement according to the present invention are that the latter has afforded possibilities of allowing two holder units to execute a plane-parallel circular movement, with their relationship to each other being maintained in respect of a reference direction in each holder unit, even when certain forces are acting to change this relationship, and this provides a high degree of precision of the movement. It is also possible to allow the perpendicular distance between the holder units to be constant or to vary during the plane-parallel circular movement.

This provides a possibility of allowing one holder unit to be fixed relative to a base, while the second holder unit can, for example, hold a tool which has to have a specific orientation in relation to the base. Upon a displacement of the second holder unit, and thus of the tool, the orientation of the tool in relation to the base is maintained, which fact may be crucial, for example in production or machining in the engineering industry.

That which can principally be regarded as characterizing a swivel arrangement in accordance with the present invention is specified in the characterizing clause of patent claim 1 following.

BRIEF DESCRIPTION OF THE FIGURES

A swivel arrangement having the features associated with the present invention will now be described in greater detail for illustrative purposes and with reference to the attached drawing, in which.

DESCRIPTION OF EMBODIMENT NOW PROPOSED

It has long been known to use two parallel arms so as to be able to raise and lower two units in relation to each other, with the parallelism between the units being maintained.

It also possible to give one unit a plane-parallel circular movement relative to the second unit by means of assigning the parallel arms a common rotatable attachment.

However, this means that a reference direction in the second unit will rotate in relation to a reference direction in the base on which the rotatable attachment is secured.

Figure 2:
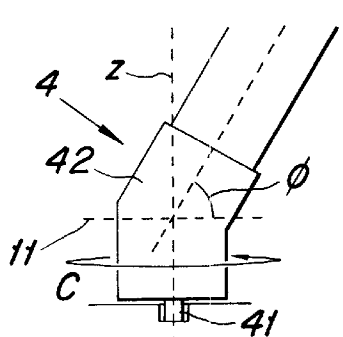
FIG. 2 shows, in a simplified representation, an attachment hinge with a fixed angle of the arm relative to a plane.

The object of the present invention is to make available a swivel arrangement in which the arm structure controls the relationship between the two holder units not only in such a way that the two planes maintain their parallelism relative to each other, but also in such a way that two reference directions, one in each plane according to FIG. 2, at all times maintain the same relationship to each other, irrespective of the raising and lowering of the second holder unit relative to the first holder unit and irrespective of a plane-parallel circular movement between the two holder units.

Figure 1:
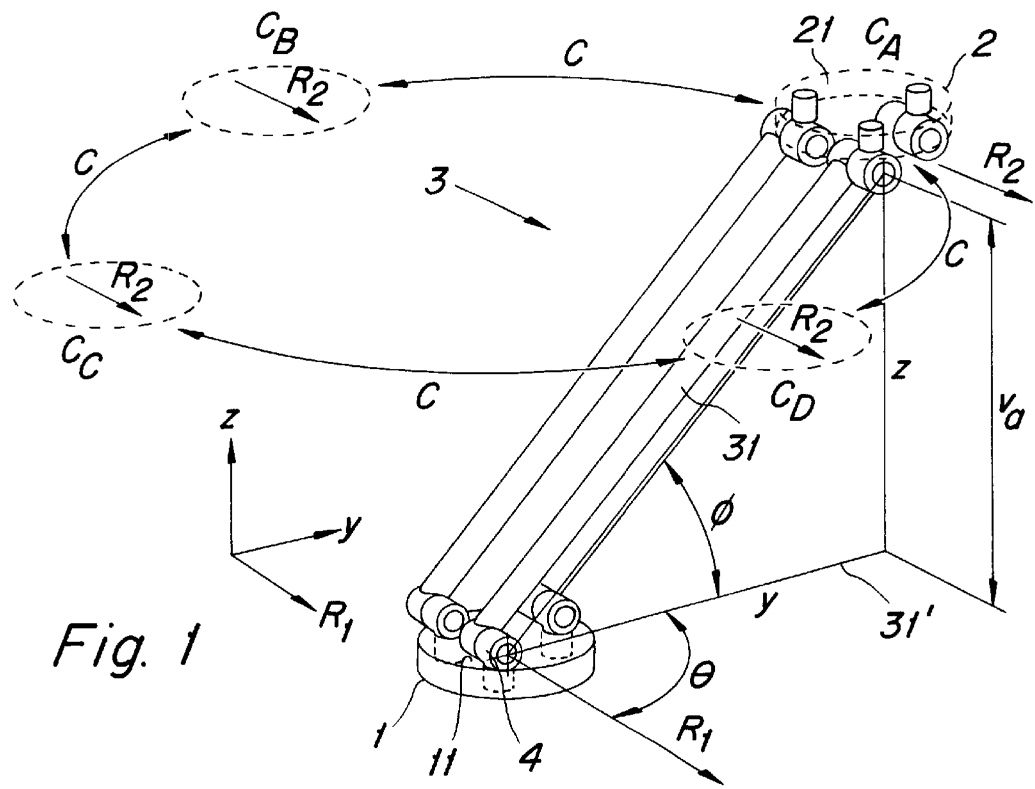
FIG. 1 shows, in a very diagrammatic and perspective view, an arrangement according to the present invention, illustrating the relationship between two planes upon a plane-parallel circular movement of one plane relative to the second plane.

Taking this prior art as a starting point, the present invention specifies a swivel arrangement which, according to FIG. 1, comprises a first holder unit and a second holder unit, where the first holder unit 1 is assigned a first plane 11 and the second holder unit 2 is assigned a second plane 21.

The first plane 11 is parallel to the second plane 21 upon a relative movement between the holder units by virtue of an arm structure 3 which joins the first holder unit 1 to the second holder unit 2.

FIG. 1 shows that the second holder unit 2 can be controlled, via the arm structure 3, in a complete, or a partial, circular plane-parallel movement "C" in relation to the first holder unit 1.

A first reference direction $R_1$, which is fixed in relation to, and coincides with, the first plane 11 is, by virtue of the control of the arm structure 3, parallel to, or in each case essentially parallel to, a second reference direction $R_2$, which is fixed in relation to, and coincides with, the second plane 21 during the whole of the plane-parallel circular movement "C", which is illustrated in FIG. 1, where the positions $C_A$, $C_B$, $C_C$ and $C_D$ show different locations for the plane 21 during the rotation C.

So as to be able to control the relative movement between the two holder units in this way, the arm structure 3 has to include at least three parallel arms, and the arms belonging to the arm structure must have the same length or in each case essentially the same length.

This figure also illustrates that the arrangement also includes a first attachment hinge 4 belonging to the respective arm 31.

In the same way, a second attachment hinge belonging to the respective arm is attached to the other end of the arm.

Each arm is secured to the first holder unit via associated first attachment hinges and to the second holder unit via associated second attachment hinges.

Each first attachment hinge 4 is adapted to give the associated arm 31 a first angle "$\phi$" in relation to the first plane 11, and each arm 31 can be controlled, via associated first attachment hinges 4, so that a projection 31' of the arm 31 in the first plane 11 is given a second angle "$\theta$" in relation to the first reference direction $R_1$.

For illustrative purposes, the plane 11 in FIG. 1 is defined by the direction $R_1$ and an auxiliary axis "y", where an axis "z" is a normal to the plane 11, and which also constitutes an axis of rotation in later figures.

In the same way, although not shown in the figure, each second attachment hinge is adapted to give the associated arm a third angle in relation to the second plane, and each arm can be controlled, via associated second attachment hinges, so that a projection of the arm in the second plane is given a fourth angle in relation to the second reference direction.

Because this is a parallel arm structure, it is obvious that the first angle "ϕ" is the same size as the third angle, and that the second angle "θ" is the same size as the fourth angle, which means that the two reference directions $R_1$, $R_2$ have an unaltered position in relation to each other, regardless of changes in the respective second and fourth angles.

For the purpose of clarity, in the description which follows, only a first attachment hinge and its relationship to the first holder unit will be described. It is obvious to a skilled person that all the first attachment hinges belonging to the arrangement operate in the same way, and that the respective second attachment hinges cooperate in the same way with the second holder unit, and it is for this reason that we do not intend cluttering the following description and the drawings with all these details.

For the same reason, only the first angle and second angle will be discussed in the description which follows, but here once again it is obvious that the same points apply to the third angle and fourth angle.

In order to permit a complete plane-parallel circular "C" movement between the two holder units 1, 2, the second angle "θ" can be assigned, via the first attachment hinge, an arbitrary value starting from a complete circular line.

FIG. 2 shows that this is achieved by virtue of the fact that the first attachment hinge 4 comprises a first rotatable attachment 41 which cooperates with the first holder unit 1 and is rotatable about an axis of rotation "z" which is assigned a perpendicular orientation in relation to the first plane 11.

The arm structure can be adapted to control the second holder unit at a predetermined perpendicular distance between the first holder unit and the second holder unit during the plane-parallel circular movement.

This can be achieved by making it possible for the first angle "ϕ", to be assigned, via the first attachment hinge 4, a constant value during the plane-parallel circular movement "C".

Figure 7:
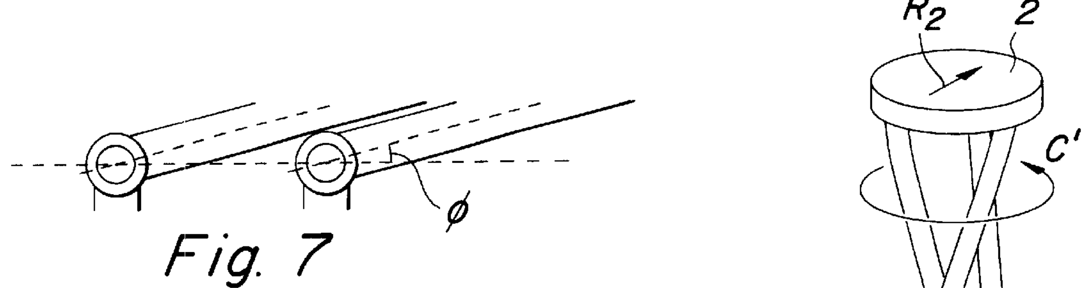
FIG. 7 shows, in a simplified representation, how an angle of an arm relative to a plane is limited downwards.

One way, in accordance with FIG. 7, is to allow the first angle "ϕ" to be assigned, via a permanent setting of the first attachment hinge 4, a fixed value which is defined in advance, by allowing the first attachment hinge to comprise a second fixed attachment 42, where the fixed attachment cooperates with the arm 31, which in this way can be assigned the fixed angle value which has been defined in advance.

Another way of allowing the arm structure to be adapted to control the second holder unit at a predetermined perpendicular distance between the first holder unit and the second holder unit during the plane-parallel circular movement is to allow the first angle "ϕ" to be assigned, via a lockable setting of the first attachment hinge, one of several available fixed values from a limited circular line.

Figure 3:
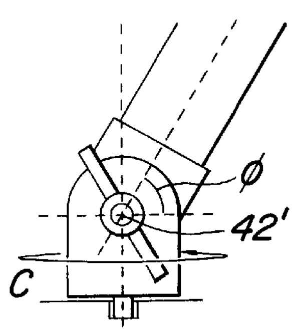
FIG. 3 shows, in a simplified representation, an attachment hinge with a lockable angle of the arm relative to a plane.

This can be done, according to FIG. 3, by allowing at least one of the attachment hinges 4, belonging to the arrangement, to include a second lockable, pivotable attachment 42' which cooperates with the associated arm 31, which can be assigned the available fixed angle value via the lockable, pivotable attachment.

It may also be desirable to allow the second holder unit to be able to vary its perpendicular distance relative to the first holder unit during the plane-parallel circular movement.

Figure 4:
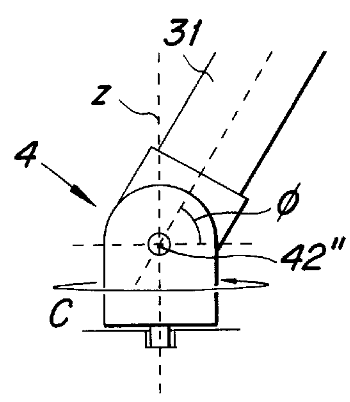
FIG. 4 shows, in a simplified representation, an attachment hinge with a continuously variable angle of the arm relative to a plane.

FIG. 4 shows that this can be achieved by virtue of the fact that the first angle "ϕ" can be assigned, via the first attachment hinge 4, a variable value from a limited circular line during the plane-parallel circular movement "C", by means of the first attachment hinge 4 comprising a second pivotable attachment 42" which cooperates with the arm 31, as a result of which the arm 31 can be assigned the variable angle value via the pivotable attachment.

Figure 5:
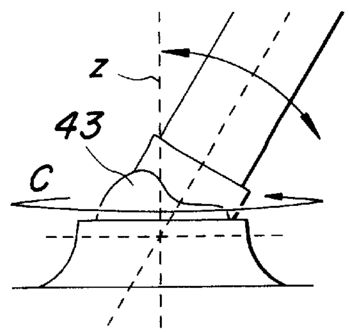
FIG. 5 shows, in a simplified representation, an attachment hinge consisting of a ball joint.

The first rotatable attachment and the second pivotable attachment can consist of one rotatable and pivotable attachment which, for example, according to FIG. 5, could consist of a ball joint 43 which can afford both a pivoting and a rotating movement.

It is obvious that one arrangement can include various types of the attachment hinges described above. However, in the case where ball joints are used, the first attachment hinge and the second attachment hinge belonging to at least one arm must consist of attachment hinges with a pivotable and a rotatable attachment in order to be able to take up torsional forces which occur in the arms, which is required for maintaining the parallelism between the holder units and maintaining the parallelism between the two directions $R_1$, $R_2$. A ball joint cannot take up such torsional forces, for which reason not all the arms can be mounted with ball joints.

An arrangement according to the present invention is intended to be able to support various loads. To make it easier for an operator to use the arrangement, it is expedient, according to FIG. 6, to allow at least one of the arms 31 with associated first and second attachment hinges 4, 4' to cooperate with a spring arrangement 5 which, upon suitable loading of the arrangement, is adapted to give the arrangement a balanced state in respect of the perpendicular distance $V_a$.

Such a spring arrangement may expediently consist of an adjustable pneumatic spring which can be set to compensate for loads of different magnitudes.

FIG. 7 shows that on account of the space which each arm requires, and depending on the mutual distance between the three arms, in order to ensure that two arms will not strike against each other during the plane-parallel circular movement, the circular line from which the angle values can be taken for the first angle "ϕ" is limited in respect of the smallest possible value. It is for this reason that the first angle "ϕ" needs to be greater than 10°, preferably greater than 30°.

Figure 8:
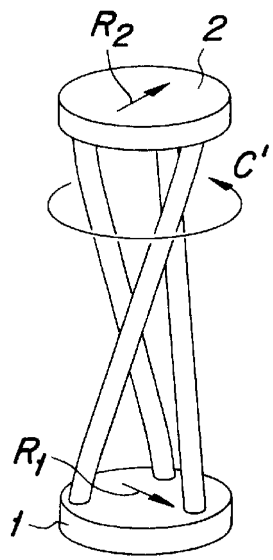
FIG. 8 shows, in a simplified representation, how an angle of an arm relative to a plane, which is a 90° angle, can give an unstable structure.

FIG. 8 shows that if the first angle "ϕ" is near to 90°, the parallel arm structure becomes unstable and good control over the parallelism of the two reference lines $R_1$, $R_2$ becomes difficult to ensure, since it then becomes possible to force the second holder unit 2 into a limited rotational movement "C" relative to the first holder unit 1.

It is therefore also necessary to limit the circular line, from which the angle values for the first angle "ϕ" can be taken, to a maximum permissible value which is expediently 90°, preferably 70°.

Referring once again to FIG. 6, it will be seen that a swivel arrangement B1 according to the present invention can be combined with other swivel arrangements B2, which can be in accordance with the prior art or in accordance with the present invention.

It is in this case expedient for the one holder unit 1 to be secured to a fixed base. This base can be both a horizontal and a vertical or inclined surface. It can also consist of an underside as well as a top side. According to FIG. 9, this base can consist, for example, of a table 6 or a processing machine.

Fixed is understood to mean that the base is a fixed reference point for the arm, but this base may nevertheless be movable, for example, relative to a floor or the ground. For example, the base can be a part of an industrial robot, where the arrangement is a part of an arm belonging to the industrial robot.

Figure 6:
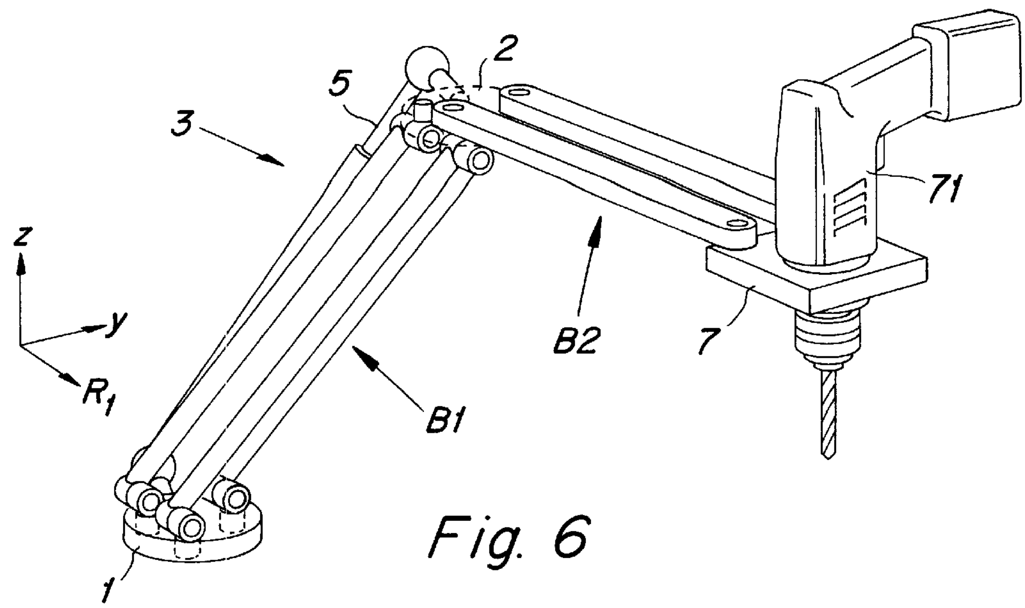
FIG. 6 shows, in a simplified representation, a swivel arrangement which cooperates with a further type of arm arrangement, where the swivel arrangement is balanced by means of a spring arrangement.

FIG. 6 also shows that the second holder unit 2 can be adapted to cooperate with different types of holders 7, such as holders intended for different tools 71, and in the same way it can be adapted, for example, to cooperate with a lighting fixture.

Figure 9:
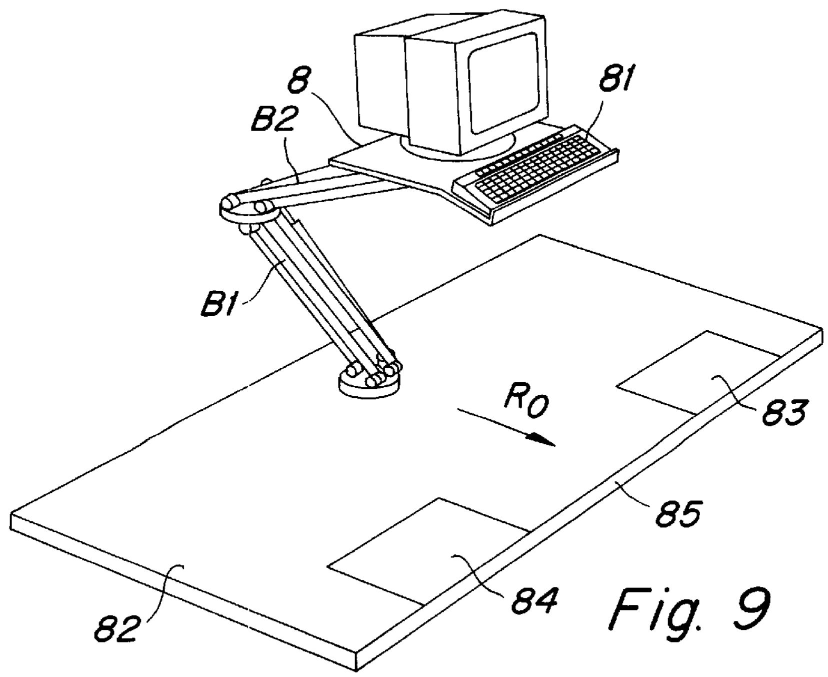
FIG. 9 shows, in a perspective view, a swivel arrangement cooperating with a further swivel arrangement and a support for a computer.

FIG. 9 shows an example in which the second holder unit 2 is adapted to cooperate with a support 8 which is intended for personal computers 81, which affords a possibility of simply raising and lowering the computer 81 relative to the base, which in this case is a table 82, and to move it to different work positions 83, 84 on a table edge 85 common to the work positions, while maintaining the direction $R_d$ of the computer relative to the table edge 85.

As is shown in FIGS. 6 and 9, two swivel arrangements B1, B2 according to the present invention can cooperate with each other by virtue of the fact that the second holder unit belonging to the first arrangement B1 cooperates with the first holder unit belonging to the second arrangement B2.

The invention is of course not limited to the embodiment specified hereinabove by way of example, and instead can be modified within the scope of the inventive concept as illustrated in the patent claims following.

I claim:

1. A swivel arrangement comprising:

a first holder unit;

a second holder unit;

the first holder unit being disposed in a first plane and the second holder unit being disposed in a second plane, the first plane being parallel to the second plane upon a relative movement between the the first and second holder units;

an arm structure joining the first holder unit to the second holder unit;

the second holder unit being movable, via the arm structure, in at least a partial circular plane-parallel movement relative to the first holder unit, and, as a result of movement of the second holder unit relative to the first holder unit, a first reference direction, which is fixed in relation to, and coincides with, the first plane is substantially parallel to a second reference direction, which is fixed in relation to, and coincides with, the second plane during the plane-parallel circular movement;

the arm structure including at least three parallel arms, first attachment hinges, a first attachment hinge of the first attachment hinges corresponding to each arm, and second attachment hinges, a second attachment hinge of the second attachment hinges corresponding to each arm, the arms being of substantially a same length as each other;

each arm being secured to the first holder unit via its corresponding first attachment hinge and to the said second holder unit via its corresponding second attachment hinge, each first attachment hinge permitting its corresponding arm to be disposed at a first angle in relation to the first plane, each arm being controlled, via its corresponding first attachment hinge, so that a first projection of the arm in the first plane forms a second angle relative to the first reference direction, and each second attachment hinge permitting its corresponding arm to be disposed at a third angle relative to the second plane, each arm being controlled, via its corresponding second attachment hinge, so that a second projection of the arm in the second plane forms a fourth angle in relation to the second reference direction, the first angle being a same size as the third angle, and the second angle being a same size as the fourth angle, wherein, for each arm, the first attachment hinge and the second attachment hinge each comprises a first rotatable attachment and a second pivotable attachment, and for at least one arm of the three arms, the first attachment hinge and the second attachment hinge each comprises a first rotatable attachment and a separate second pivotable attachment, for each arm, the first rotatable attachment of the first attachment hinge and the second attachment hinge cooperating with the first holder unit and the second holder unit, respectively, and the second pivotable attachment of the first attachment hinge and the second attachment hinge cooperating with the arm, the rotatable attachment being rotatable about an axis of rotation having a perpendicular orientation relative to each of the first and second planes, and the pivotable attachment being pivotable about a point disposed on the axis of rotation.

2. The swivel arrangement according to claim 1, wherein, for each arm, the first angle and the third is less than 90° and greater than 10°.

3. The swivel arrangement according to claim 1, wherein, each arm is positionable by its corresponding first and second attachment hinges such that the second angle and the fourth angle define arbitrary values.

4. The swivel arrangement according to claim 3, wherein the first and second attachment hinges are permanently set such that each arm is positioned at fixed values for the first angle and the third angle.

5. The swivel arrangement according to claim 3, wherein at least one of the first and the second attachment hinges is lockable to fix values of the second and the fourth angles.

6. The swivel arrangement according to claim 5, wherein the pivotable attachment of at least one of the first and said second attachment hinges is lockable, the rotatable attachment of the at least one of the first and second attachment hinges cooperating with at least one of the first and second holder units, respectively, the lockable pivotable attachment cooperating with its corresponding arm, and each arm is fixed at an angle relative to the first and second holder units by the lockable pivotable attachment.

7. The swivel arrangement according to claim 6, wherein at least one of the arms and its corresponding first and second attachment hinges cooperates with a spring arrangement, the spring arrangement being sufficiently loaded to provide a balanced state to the swivel arrangement in relation to the angle between the at least one of the arms and the first and second holder units upon disengagement of the lockable pivotable attachment.

8. The swivel arrangement according to claim 3, wherein, each arm is positionable by its corresponding first and second attachment hinges such that the first angle and the third angle define a constant value.

9. The swivel arrangement according to claim 3, the first attachment hinges and the second attachment hinges permit variation of the first angle and the third angle during plane-parallel circular movement.

10. The swivel arrangement according to claim 1, wherein the arm structure maintains the second holder unit at a predetermined perpendicular distance from the first holder unit.

11. The swivel arrangement according to claim 10, wherein, each arm is positionable by its corresponding first and second attachment hinges such that the first angle and the third angle define a constant value.

12. The swivel arrangement according to claim 1, wherein, each arm is positionable by its corresponding first and second attachment hinges such that the first angle and the third angle define a constant value.

13. The swivel arrangement according to claim 12, wherein at least one of the first and the second attachment hinges is lockable to fix values of the second and the fourth angles.

14. The swivel arrangement according to claim 1, wherein the arm structure permits varying a perpendicular distance between the second holder unit the first holder unit.

15. The swivel arrangement according to claim 14, the first attachment hinges and the second attachment hinges permit variation of the first angle and the third angle during plane-parallel circular movement.

16. The swivel arrangement according to claim 1, the first attachment hinges and the second attachment hinges permit variation of the first angle and the third angle during plane-parallel circular movement.

17. The swivel arrangement according to claim 16, the rotatable attachment wherein each of the first and second attachment hinges cooperates with the first and second holder units, respectively, and, for each first and each second attachment hinge, the pivotable attachment cooperates with its corresponding arm, and each arm is positionable at variable angles relative to the first and second holder units via the pivotable attachment.

18. The swivel arrangement according to claim 16, the rotatable attachment wherein each of the first and second attachment hinges cooperates with the first and second holder units, respectively, and, for each first and each second attachment hinge, the pivotable attachment cooperates with its corresponding arm, and each arm is positionable at variable angles relative to the first and second holder units via the pivotable attachment.

19. The swivel arrangement according to claim 1, the rotatable attachment wherein each of the first and second attachment hinges cooperates with the first and second holder units, respectively, and, for each first and each second attachment hinge, the pivotable attachment cooperates with its corresponding arm, and each arm is positionable at variable angles relative to the first and second holder units via the pivotable attachment.

20. The swivel arrangement according to claim 13, wherein at least one of the arms and its corresponding first and second attachment hinges cooperates with a spring arrangement, the spring arrangement being sufficiently loaded to provide a balanced state to the swivel arrangement in relation to the angle between the at least one of the arms and the first and second holder units.

21. The swivel arrangement according to claim 1, wherein each arm is positionable relative to the first and the second holder units at variable angles.

22. The swivel arrangement according to claim 21, wherein, for each arm other than the at least one arm having the first rotatable attachment and the separate second pivotable attachment each, first and each second attachment includes a ball joint.

23. The swivel arrangement according to claim 21, wherein at least one of the arms and its corresponding first and second attachment hinges cooperates with a spring arrangement, the spring arrangement being sufficiently loaded to provide a balanced state to the swivel arrangement in relation to the angle between the at least one of the arms and the first and second holder units.

24. The swivel arrangement according to claim 1, further comprising a fixed base, wherein the first holder unit cooperates with the fixed base.

25. The swivel arrangement according to claim 1, further comprising a holder, wherein the second holder unit cooperates with the holder.

26. The swivel arrangement according to claim 1, further comprising a support, wherein the second holder unit cooperates with the support.

27. The swivel arrangement according to patent claim 1, further comprising a second link arrangement, wherein the second holder unit cooperating with the second link arrangement.

28. The swivel arrangement according to claim 1, further comprising a second link arrangement, wherein the first holder unit cooperating with the second link arrangement.

29. A swivel arrangement comprising:

a first holder unit;

a second holder unit;

the first holder unit being disposed in a first plane and the second holder unit being disposed in a second plane, the first plane being parallel to the second plane upon a relative movement between the first and second holder units;

an arm structure joining the first holder unit to the second holder unit;

the second holder unit being movable, via the arm structure, in at least a partial circular plane-parallel movement relative to the first holder unit, and, as a result of movement of the second holder unit relative to the first holder unit, a first reference direction, which is fixed in relation to, and coincides with, the first plane is substantially parallel to a second reference direction, which is fixed in relation to, and coincides with, the second plane during the plane-parallel circular movement;

the arm structure including at least three parallel arms, first attachment hinges, a first attachment hinge of the first attachment hinges corresponding to each arm, and second attachment hinges, a second attachment hinge of the second attachment hinges corresponding to each arm, the arms being of substantially a same length as each other;

each arm being secured to the first holder unit via its corresponding first attachment hinge and to the said second holder unit via its corresponding second attachment hinge, each first attachment hinge permitting its corresponding arm to be disposed at a first angle in relation to the first plane, each arm being controlled, via its corresponding first attachment hinge, so that a first projection of the arm in the first plane forms a second angle relative to the first reference direction, and each second attachment hinge permitting its corresponding arm to be disposed at a third angle relative to the second plane, each arm being controlled, via its corresponding second attachment hinge, so that a second projection of the arm in the second plane forms a fourth angle in relation to the second reference direction, the first angle being a same size as the third angle, and the second angle being a same size as the fourth angle, wherein each first and each second attachment hinge comprises a first rotatable attachment and a separate second fixed attachment, the first rotatable attachment of each first and each second attachment hinge cooperating with the first holder unit and the second holder unit, respectively, the second fixed attachment of each first and each second attachment hinge cooperating with a corresponding one of the arms corresponding to each first and each second attachment hinge, the rotatable attachment being rotatable about an axis of rotation having a perpendicular orientation relative to each of the first and second planes, and the pivotable attachment being pivotable about a point disposed on the axis of rotation, and each arm being disposed at a fixed angle relative to the first and second planes via corresponding second fixed attachments.

* * * * *